US012639225B2

(12) United States Patent
Helmick et al.

(10) Patent No.: US 12,639,225 B2
(45) Date of Patent: May 26, 2026

(54) STATUS REPORTING FOR STORAGE DEVICE

(71) Applicant: Samsung Electronics Co., Ltd., Suwon-si (KR)

(72) Inventors: Daniel Lee Helmick, Thornton, CO (US); Jiwon Chang, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 18/520,461

(22) Filed: Nov. 27, 2023

(65) Prior Publication Data

US 2025/0061061 A1 Feb. 20, 2025

Related U.S. Application Data

(60) Provisional application No. 63/532,829, filed on Aug. 15, 2023.

(51) Int. Cl.
*G06F 12/0873* (2016.01)
*G06F 12/0804* (2016.01)

(52) U.S. Cl.
CPC ...... *G06F 12/0873* (2013.01); *G06F 12/0804* (2013.01)

(58) Field of Classification Search
CPC .......................... G06F 12/0873; G06F 12/0804
See application file for complete search history.

(56) References Cited

U.S. PATENT DOCUMENTS

| | | | |
|---|---|---|---|
| 5,956,473 A * | 9/1999 | Ma | G06F 11/1068 |
| | | | 714/E11.038 |
| 8,751,731 B2 | 6/2014 | Asnaashari et al. | |
| 9,251,086 B2 | 2/2016 | Peterson et al. | |
| 9,588,886 B2 | 3/2017 | Edgar et al. | |
| 10,365,849 B2 | 7/2019 | Feldman et al. | |
| 11,194,750 B2 | 12/2021 | Maroney et al. | |
| 11,397,672 B2 | 7/2022 | Ju et al. | |
| 2014/0173268 A1* | 6/2014 | Hashimoto | G11C 29/52 |
| | | | 713/2 |
| 2014/0359245 A1* | 12/2014 | Jones | G06F 3/0608 |
| | | | 711/170 |
| 2015/0169230 A1* | 6/2015 | Asnaashari | G06F 3/0631 |
| | | | 711/103 |
| 2017/0038971 A1* | 2/2017 | Takeuchi | G06F 12/0246 |
| 2017/0160976 A1* | 6/2017 | Thangaraj | G06F 12/0246 |

FOREIGN PATENT DOCUMENTS

| | | |
|---|---|---|
| CN | 107797934 B | 7/2022 |
| JP | 7048650 B2 | 3/2022 |

* cited by examiner

*Primary Examiner* — Prasith Thammavong

(74) *Attorney, Agent, or Firm* — Womble Bond Dickinson (US) LLP

(57) ABSTRACT

A system and method for status reporting for a storage device. In some embodiments, the method includes: receiving, by a persistent storage device, a command, the command requesting a status associated with a first logical block address; determining the status; and sending a response to the command, the response including the status.

18 Claims, 6 Drawing Sheets

605 Receive, by a persistent storage device, a command, the command requesting a status associated with a first logical block address 610 Determine the status 615 Send a response to the command, the response comprising the status.

STATUS REPORTING FOR STORAGE DEVICE

CROSS-REFERENCE TO RELATED APPLICATION(S)

The present application claims priority to and the benefit of U.S. Provisional Application No. 63/532,829, filed Aug. 15, 2023, entitled "ACCELERATING LBA STATUS REPORTING BY LEVERAGING GRANULARITY", the entire content of which is incorporated herein by reference.

FIELD

One or more aspects of embodiments according to the present disclosure relate to a storage device, and more particularly to a system and method for status reporting for a storage device.

BACKGROUND

A storage device may include persistent memory and a system for mapping logical addresses (or logical block address) to physical addresses in the persistent memory.

It is with respect to this general technical environment that aspects of the present disclosure are related.

SUMMARY

According to an embodiment of the present disclosure, there is provided a method, including: receiving, by a persistent storage device, a command, the command requesting a status associated with a first logical block address; determining the status; and sending a response to the command, the response including the status.

In some embodiments, the command includes a logical block address range, the first logical block address being within the logical block address range.

In some embodiments, the status includes a status of an allocation granularity, the allocation granularity including the first logical block address.

In some embodiments, the determining of the status includes determining that the allocation granularity has a size at least as great as a size of a mapping unit.

In some embodiments, the determining of the status further includes: querying a logical-to-physical table for the first logical block address, to obtain a first query result; determining, based on the first query result, that the status of a mapping unit containing the first logical block address is unmapped; and in response to determining that the status of the mapping unit containing the first logical block address is unmapped, querying the logical-to-physical table for a second logical block address of the allocation granularity, to obtain a second query result.

In some embodiments, the determining of the status further includes: determining, based on the second query result, that the status of a mapping unit containing the second logical block address is mapped; and in response to determining that the status of the mapping unit containing the second logical block address is mapped, determining that the status of the allocation granularity is mapped.

In some embodiments, the second logical block address differs from the first logical block address by at least an amount corresponding to the size of the mapping unit.

In some embodiments, the determining of the status includes determining that an allocation granularity has a size smaller than a size of a mapping unit.

In some embodiments, the determining of the status further includes: querying a logical-to-physical table for the first logical block address, to obtain a first query result; determining, based on the first query result, that the status of a mapping unit containing the first logical block address is unmapped; and in response to determining that the status of the mapping unit containing the first logical block address is unmapped, determining that the status of the allocation granularity is unmapped.

In some embodiments, the determining of the status further includes: querying a logical-to-physical table for the first logical block address, to obtain a first query result; determining, based on the first query result, that the status of a mapping unit containing the first logical block address is mapped; in response to determining that the status of the mapping unit containing the first logical block address is mapped, querying data or metadata, associated with the first logical block address, in persistent memory, to obtain a second query result; determining, based on the second query result, that the status of the first logical block address is unmapped; and in response to determining that the status of the first logical block address is unmapped, querying data or metadata, associated with a second logical block address within the allocation granularity, in persistent memory, to obtain a third query result.

In some embodiments, the determining of the status further includes: determining, based on the third query result, that the status of the second logical block address is mapped; and in response to determining that the status of the second logical block address is mapped, determining that the status of the allocation granularity is mapped.

In some embodiments, the determining of the status further includes: querying a logical-to-physical table for the first logical block address, to obtain a first query result; determining, based on the first query result, that the status of a mapping unit containing the first logical block address is mapped; in response to determining that the status of the mapping unit containing the first logical block address is mapped, querying data or metadata, associated with the first logical block address, in persistent memory to obtain a second query result; determining, based on the second query result, that the status of the first logical block address is mapped; and in response to determining that the status of the first logical block address is mapped, determining that the status of the allocation granularity is mapped.

According to an embodiment of the present disclosure, there is provided a persistent storage device, including: persistent memory; a processing circuit; and memory, the memory storing instructions, that, when executed by the processing circuit, cause the processing circuit to perform a method, the method including: receiving a command, the command requesting a status associated with a first logical block address; determining the status; and sending a response to the command, the response including the status.

In some embodiments: the status includes a status of an allocation granularity, the allocation granularity including the first logical block address, and the determining of the status includes: determining that the allocation granularity has a size at least as great as a size of a mapping unit; querying a logical-to-physical table for the first logical block address, to obtain a first query result; determining, based on the first query result, that the status of a mapping unit containing the first logical block address is unmapped; in response to determining that the status of the mapping unit containing the first logical block address is unmapped, querying the logical-to-physical table for a second logical block address of the allocation granularity, to obtain a second query result; determining, based on the second query result, that the status of a mapping unit containing the second logical block address is mapped; and in response to determining that the status of the mapping unit containing the second logical block address is mapped, determining that the status of the allocation granularity is mapped.

In some embodiments: the status includes a status of an allocation granularity, the allocation granularity including the first logical block address; and the determining of the status includes: determining that an allocation granularity has a size smaller than a size of a mapping unit; querying a logical-to-physical table for the first logical block address, to obtain a first query result; determining, based on the first query result, that the status of a mapping unit containing the first logical block address is unmapped; and in response to determining that the status of the mapping unit containing the first logical block address is unmapped, determining that the status of the allocation granularity is unmapped.

In some embodiments: the status includes a status of an allocation granularity, the allocation granularity including the first logical block address; the determining of the status includes: determining that an allocation granularity has a size smaller than a size of a mapping unit; querying a logical-to-physical table for the first logical block address, to obtain a first query result; determining, based on the first query result, that the status of a mapping unit containing the first logical block address is mapped; in response to determining that the status of the mapping unit containing the first logical block address is mapped, querying data or metadata, associated with the first logical block address, in persistent memory, to obtain a second query result; determining, based on the second query result, that the status of the first logical block address is unmapped; in response to determining that the second mapping unit is unmapped, querying data or metadata, associated with a second logical block address within the allocation granularity, in persistent memory, to obtain a third query result; determining, based on the third query result, that the status of the second logical block address is mapped; and in response to determining that the status of the second logical block address is mapped, determining that the status of the allocation granularity is mapped.

In some embodiments: the status includes a status of an allocation granularity, the allocation granularity including the first logical block address; and the determining of the status includes: querying a logical-to-physical table for the first logical block address, to obtain a first query result; determining, based on the first query result, that the status of a mapping unit containing the first logical block address is mapped; in response to determining that the status of the mapping unit containing the first logical block address is mapped, querying data or metadata, associated with the first logical block address, in persistent memory to obtain a second query result; determining, based on the second query result, that the status of the first logical block address is mapped; and in response to determining that the status of the first logical block address is mapped, determining that the status of the allocation granularity is mapped.

According to an embodiment of the present disclosure, there is provided a system, including: a host; and a persistent storage device, connected to the host, the host being configured to send, to the persistent storage device, a command, the command requesting a status associated with a first logical block address, the persistent storage device being configured, in response to receiving the command, to: determine the status; and send a response to the command, the response including the status.

In some embodiments, the command includes a logical block address range, the first logical block address being within the logical block address range.

In some embodiments, the status includes a status of an allocation granularity, the allocation granularity including the first logical block address.

BRIEF DESCRIPTION OF THE DRAWINGS

These and other features and advantages of the present disclosure will be appreciated and understood with reference to the specification, claims, and appended drawings wherein:

DETAILED DESCRIPTION

The detailed description set forth below in connection with the appended drawings is intended as a description of exemplary embodiments of a system and method for status reporting for a storage device provided in accordance with the present disclosure and is not intended to represent the only forms in which the present disclosure may be constructed or utilized. The description sets forth the features of the present disclosure in connection with the illustrated embodiments. It is to be understood, however, that the same or equivalent functions and structures may be accomplished by different embodiments that are also intended to be encompassed within the scope of the disclosure. As denoted elsewhere herein, like element numbers are intended to indicate like elements or features.

In a persistent storage device, each logical block address may be either mapped (to an address in persistent memory at which valid data is stored) or unmapped. In some embodiments, a persistent storage device may be configured to report to a host, upon receipt of a command requesting a status associated with a logical block address, the status, e.g., whether the logical block address is mapped (to a memory location in persistent memory) or unmapped. The reporting may be for one or more ranges of logical block addresses, in increments that may be referred to as allocation granularities.

To determine the status of any allocation granularity, the persistent storage device may check each logical block address in the allocation granularity to determine whether it is mapped (e.g., whether the mapping unit to which it belongs is mapped in the logical-to-physical table of the persistent storage device). If the allocation granularity is smaller than the mapping unit, and if the persistent storage device determines that a logical block address within the allocation granularity is mapped (e.g., if the mapping unit containing the logical block address is mapped), the persistent storage device may further query the persistent memory (e.g., query data or metadata corresponding to the logical block address) to determine whether the logical block address is mapped. Once it is determined that any logical block address in an allocation granularity is mapped, it may be determined that the allocation granularity is mapped, and the process may terminate (without checking further logical block addresses of the allocation granularity).

Figure 1:
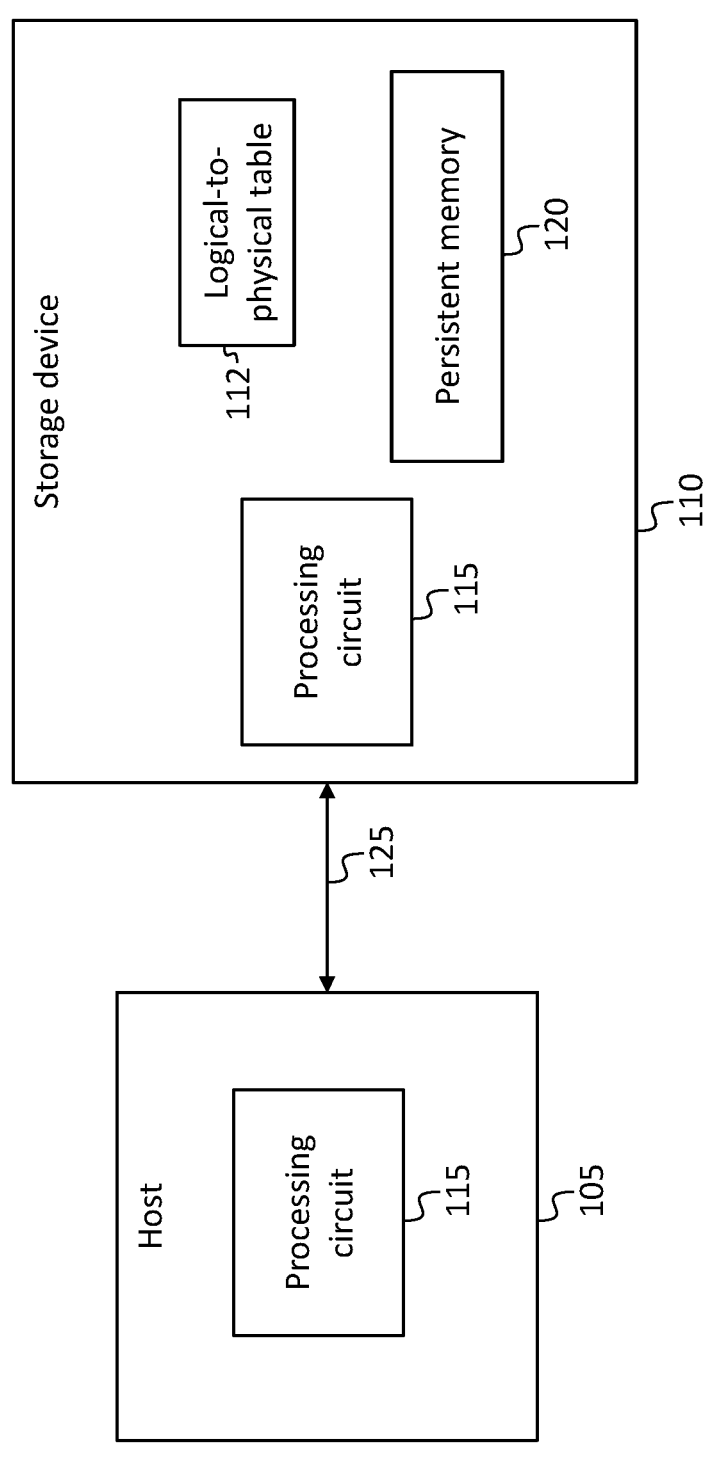
FIG. 1 is a block diagram of a host and a persistent storage device, according to an embodiment of the present disclosure.

FIG. 1 is a block diagram of a host 105 and a persistent storage device 110 (which may be a solid-state drive (SSD), a phase change memory storage device, or a hard disk drive (HDD) or another type of non-volatile storage device). The storage device 110 may have a form factor that is any one of a plurality of form factors suitable for persistent storage devices, including but not limited to 2.5″, 1.8″, MO-297, MO-300, M.2, and Enterprise and Data Center SSD Form Factor (EDSFF), and it may have an electrical interface, through which it may be connected to the host 105, that is any one of a plurality of interfaces suitable for persistent storage devices, including Peripheral Component Intercon-nect (PCI), PCI express (PCIe), Ethernet, Small Computer System Interface (SCSI), Serial AT Attachment (SATA), and Serial Attached SCSI (SAS). Each of the host 105 and the storage device 110 may include a processing circuit 115 (discussed in further detail below). The storage device 110 may also include persistent memory 120 (e.g., NAND flash), in which may be stored a logical to physical address map-ping table (or "logical-to-physical table") 112 which stores a mapping between (i) logical block addresses (LBAs), which are used by the host in read and write commands and (ii) physical addresses, which are used by the persistent storage device 110 to determine where in the persistent memory 120 to store data, or from where in the persistent memory 120 to retrieve data. The processing circuit 115 of the storage device 110 may perform (and, using the pro-cessing circuit 115 that it contains, the storage device 110 may perform) some or all of the methods described herein.

A host interface 125 (which may be an interface between the host 105 and the persistent storage device 110) may be used by the host 105 to communicate with the persistent storage device 110. The data write and read commands, as well as various media management commands may be received, by the persistent storage device 110, through the host interface 125. The host interface 125 may also be used by the persistent storage device 110 to perform data transfers to and from host system memory. The persistent storage device 110 may store data in not-AND (NAND) flash memory 120, e.g., in memory dies containing memory cells, each of which may be, e.g., a Single-Level Cell (SLC), a Multi-Level Cell (MLC), or a Triple-Level Cell (TLC). A Flash Translation Layer (FTL) may provide, based on the logical-to-physical table 112, a mapping between logical addresses used by the host and physical addresses of the data in the flash memory. The persistent storage device 110 may also include (i) a buffer (which may include, e.g., consist of, dynamic random-access memory (DRAM), and (ii) a flash interface (or "flash controller") for providing suitable signals to the flash memory. The logical-to-physical table 112 may be stored in DRAM during operation, and backed up to the persistent memory 120 in case of power loss.

In communications between the host 105 and the persis-tent storage device 110, and within the persistent storage device 110, data may be handled in certain fixed quantities. A persistent storage device 110 may have one or more namespaces, each of which may include (e.g., consist of) a respective range of logical block addresses. For example, the smallest quantity of data that may be read from the persistent storage device 110 by the host 105 may be referred to as the logical block address (LBA) size, which may be, e.g., 512 bytes or 4096 bytes, depending on the configuration of the persistent storage device 110 (which may be set at the time of manufacture of the persistent storage device 110 or which may be configurable by a format command from the host 105). As such, when the host 105 sends a read command, with (i) a first logical block address (or "start LBA (SLBA)) and (ii) a number of logical blocks (NLB) of one (e.g., requesting a single logical block starting at SLBA), to the persistent storage device 110, the persistent storage device 110 will return to the host a first quantity of data equal in size to the logical block address (LBA) size. If the host 105 sends a read command, with a (i) second logical block address (which is greater by one than the first logical block address) and (ii) a number of logical blocks (NLB) of one, to the persistent storage device 110, the persistent storage device 110 will return to the host a second quantity of data equal in size to the logical block address size. The two quantities of data returned in response to two such read commands may be stored in contiguous, non-overlapping regions of the persistent memory 120. As such, the logical block address size may also be the quantity of data corresponding to an increment of one in the logical block address.

The persistent storage device 110 may, as mentioned above, maintain a logical-to-physical table 112 which indi-cates where (i.e., at what physical address) in the persistent memory 120 the data corresponding to any logical block address is stored. A mapping unit is the smallest granularity for identifying a physical address where the data can be stored on the persistent media. The mapping unit may be greater than or equal to the logical block address size; for example, the mapping unit may be 4096 bytes and the logical block address size may be 512 bytes. In such an embodiment, when the persistent storage device 110 receives a read command for a logical block at a first logical block address, e.g., at a logical block address at the begin-ning of a mapping unit, the persistent storage device 110 may read from the persistent memory 120 one mapping unit (4096 bytes) of data, extract the 512 bytes requested by the host 105, send the extracted 512 bytes back to the host 105 (e.g., as part of a command response) and discard the remainder of the data read from the mapping unit.

If the persistent storage device 110 subsequently receives a read command from the host, with (i) a second logical block address, the second logical block address being greater than the first logical block address by one, and (ii) a number of logical blocks (NLB) of one, the persistent storage device 110 may read, from the persistent memory 120, the same mapping unit of data, extract the 512 bytes corresponding to the second logical block address, send the extracted 512 bytes back to the host 105 (e.g., as part of a command response) and discard the remainder of the map-ping unit (including the 512-byte block returned in the previous command response).

The logical-to-physical table 112 may include only logical block addresses of mapping units within which at least some memory locations are mapped. In operation, it may in certain circumstances be advantageous for the host to have status information for certain logical block addresses. This status information may include mapping information, e.g., whether certain logical block addresses are mapped. There are several potential states that correspond to a mapped state in the logical to physical table, including, for example a read uncorrectable state.

This information may be provided for regions of logical address space referred to herein as logical block address allocation granularities (or simply "allocation granularities"). The sizes of the logical block address allocation granularities may all be the same, and they may be configured, in the persistent storage device 110, at the time of manufacture, or they may be configured by the host 105. The allocation granularity may be defined to be 1 or more LBAs. The status returned for a given logical block address allocation granularity may be mapped if any logical block address within the logical block address allocation granularity has a status that is mapped, and the status returned for a given logical block address allocation granularity may be unmapped (e.g., "never written", deallocated, trimmed, formatted, etc.) if each of the logical block addresses within the logical block address allocation granularity has a status that is unmapped.

In some embodiments, the host 105 may on occasion send, to the persistent storage device 110, a command requesting a status for a range of logical block address allocation granularities including the logical block address allocation granularity associated with a logical block address. The logical block address allocation granularity may be an increment of a fixed size (the size of the logical block address allocation granularity) in the persistent memory 120 of the persistent storage device 110 for which status reporting is performed by the storage device. For example, the size of each logical block address allocation granularity may be 4096 bytes (4 KB) or it may be, e.g., 256 KB.

Figure 2:
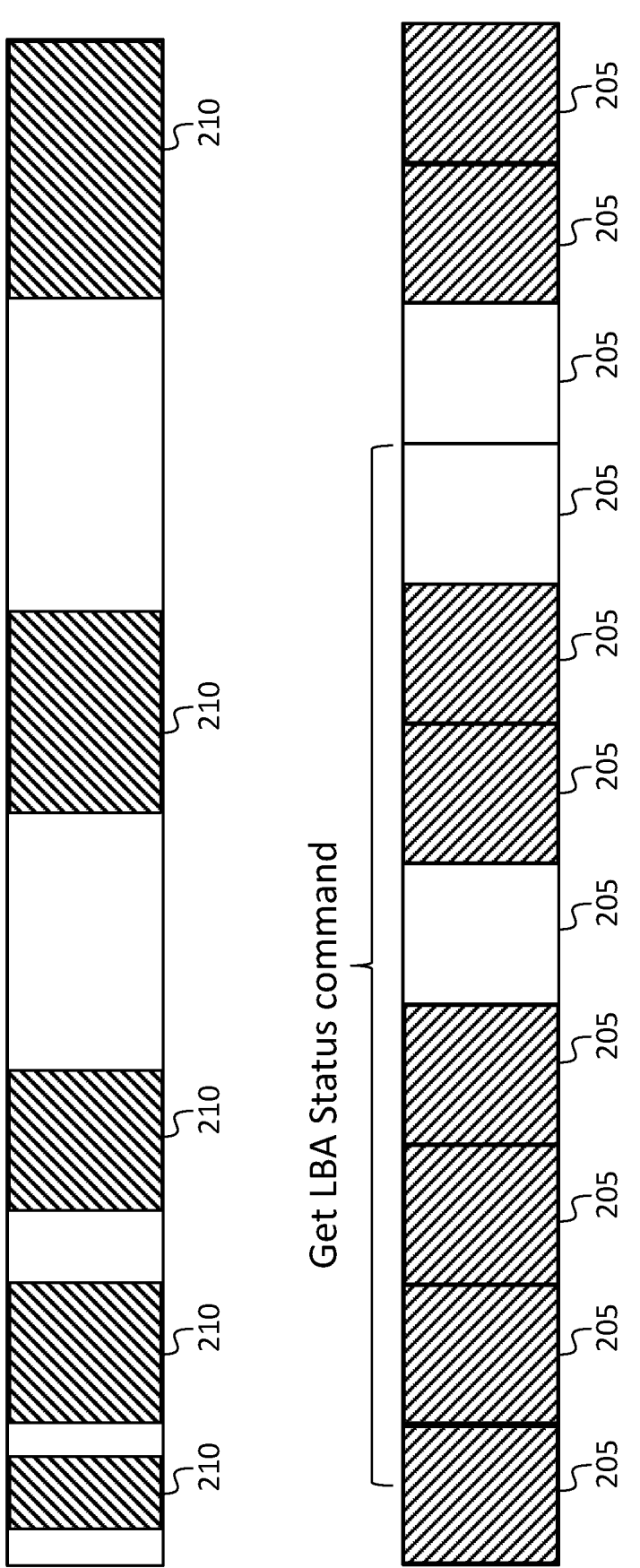
FIG. 2 is a memory layout diagram showing mapped regions and allocation granularities, according to an embodiment of the present disclosure.

In some embodiments, the host 105 may send a command (which may be referred to as a Get LBA status command) requesting a status for a range of logical block addresses, as illustrated in FIG. 2. Each of the segments 205 in the lower portion of FIG. 2 is an allocation granularity. The upper portion of FIG. 2 shows the corresponding persistent memory 120, with cross-hatched regions being mapped regions 210. The mapped regions 210 are determined, in the persistent memory 120, per logical block address size. In the embodiment of FIG. 2, the logical block address size is smaller than the allocation granularity size, and, as such, the boundaries between mapped and unmapped regions of the persistent memory 120 are not, in general, aligned with the boundaries of the allocation granularities 205.

When responding to a command requesting the status associated with a set of one or more logical block addresses, the persistent storage device 110 may make the status determination for each of the allocation granularities corresponding to the set of logical block addresses. As such, each of the allocation granularities 205 is either entirely cross-hatched (indicating that at least some of the logical block addresses within it are mapped, and that therefore the status of the allocation granularity will be reported, by the persistent storage device 110, as mapped) or entirely white (indicating that none of the logical block addresses within it are mapped, and that therefore the status of the allocation granularity will be reported, by the persistent storage device 110, as unmapped).

For example, if the persistent storage device 110 receives a command requesting the status associated with the logical block addresses encompassed by the brace bracket of FIG. 2 (which includes a portion of the first (leftmost) allocation granularity and all of each of the next seven allocation granularities), the persistent storage device 110 will return a status of mapped for the first allocation granularity, because some of the logical block addresses within it are mapped. Similarly it will return mapped as the status for each of the remaining allocation granularities except the fifth from the left (all of the logical block addresses of which are unmapped) and the eighth from the left (all of the logical block addresses of which are unmapped).

To determine whether an allocation granularity is mapped or unmapped, the persistent storage device 110 may take one of two approaches, depending on whether (i) the size of the allocation granularity is greater than or equal to the mapping unit or (ii) the size of the allocation granularity is less than the mapping unit.

If the size of the allocation granularity is greater than or equal to the mapping unit, then if the status of any logical block address in the allocation granularity is mapped, the status of the allocation granularity is mapped. As such, it is not necessary to check the status of each logical block address in the allocation granularity; instead, logical block addresses may be checked, and the checking may terminate if and when a logical block address with a status of mapped is found. The status of each logical block address may be checked by querying the logical-to-physical table 112. If an entry exists in the logical-to-physical table 112 for the logical block address (e.g., for the mapping unit containing the logical block address) then the status of the logical block address is determined to be mapped (and the status of the allocation granularity is determined to be mapped). When testing a plurality of logical block addresses (e.g., when testing a second logical block address after the status of a first logical block address has been determined to be unmapped) the logical block address may be changed (e.g., incremented, or decremented, or changed according to a pseudorandom sequence) at each iteration by an amount corresponding to the mapping unit (e.g., the second logical block address may differ from the first logical block address by at least an amount corresponding to the size of the mapping unit).

Figure 3:
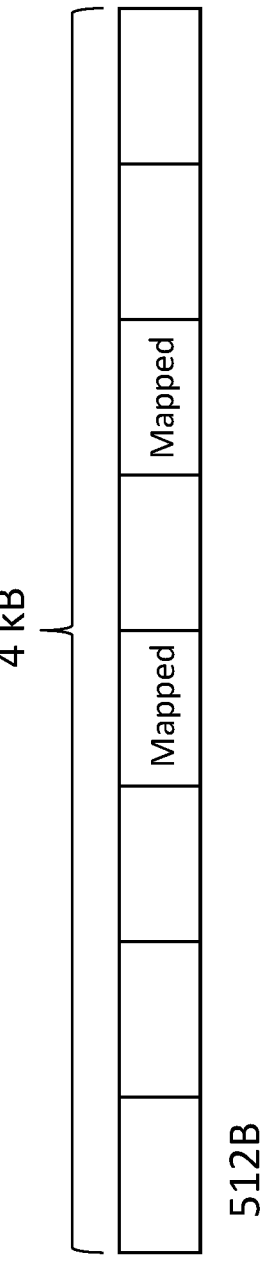
FIG. 3 is a memory layout diagram showing a mapping unit and a plurality of allocation granularities, according to an embodiment of the present disclosure.

FIG. 3 shows a circumstance in which the size of the allocation granularity (512 bytes in FIG. 3) is less than the mapping unit (4096 bytes in FIG. 3). If the boundaries of the allocation granularity are not aligned with boundaries of mapping units (e.g., if the size of the allocation granularity is less than the mapping unit), then if the status of any logical block address in the allocation granularity is unmapped, the status of the allocation granularity is unmapped. If the status of any logical block address in the allocation granularity is mapped, then the status of the allocation granularity may be mapped (if any logical block address in the mapping unit corresponds to a memory location that is both (i) mapped and (ii) in the allocation granularity) or unmapped (if no logical block address in the mapping unit corresponds to a memory location that is both (i) mapped and (ii) in the allocation granularity). As such, in this situation, the persistent memory address locations corresponding to the logical block addresses of the allocation granularity, or metadata associated with these address locations, may be queried to determine whether the corresponding logical block addresses are mapped or unmapped. If any are found to be mapped then it may be determined that the status of the allocation granularity is mapped and the process may terminate.

Figure 4:
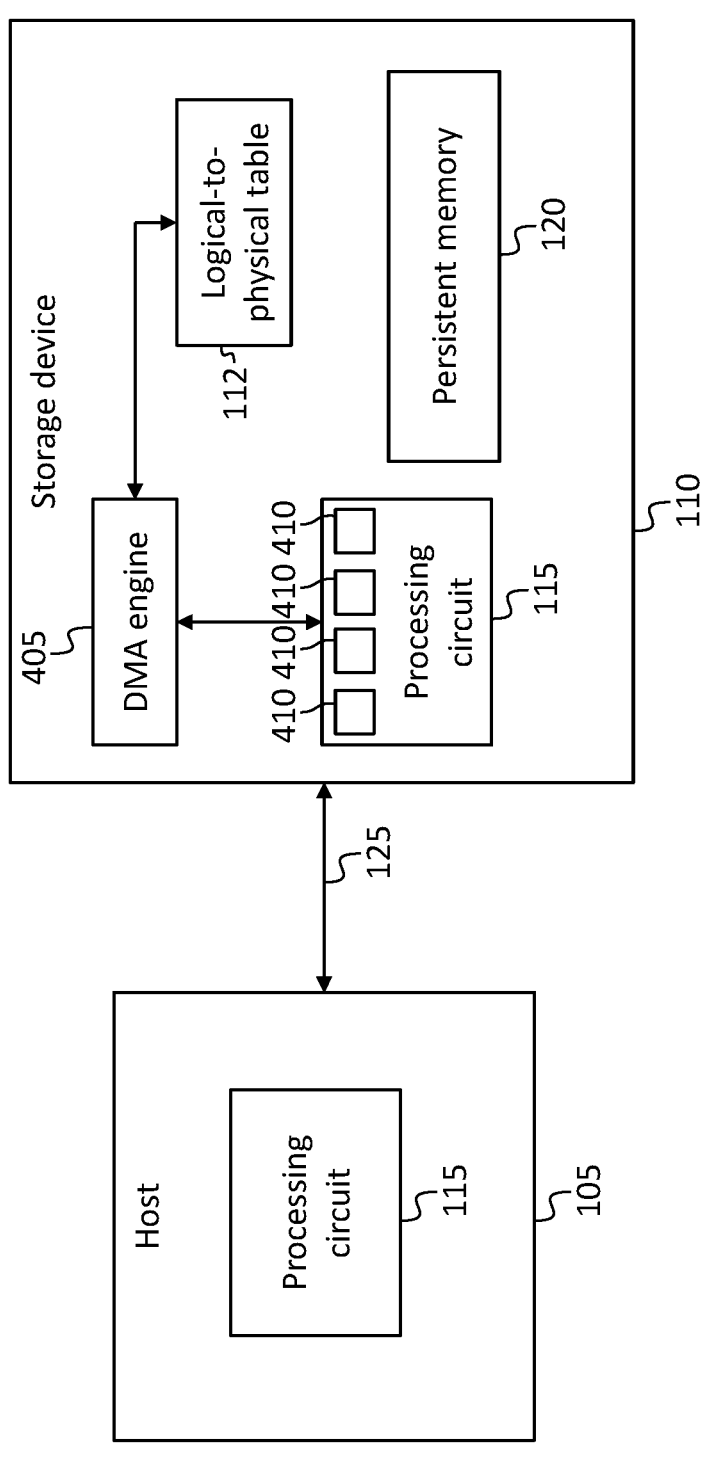
FIG. 4 is a block diagram of a system suitable for performing searches of a logical-to-physical table in parallel.

In some embodiments, hardware may be used to accelerate some or all of the methods disclosed herein. For example, as illustrated in FIG. 4, in embodiments in which the logical-to-physical table 112 is continuously sequential, a direct memory access (DMA) engine 405 executing a compare operand on the dynamic random-access memory (DRAM) space (the DRAM space in which the logical-to-physical table 112 is stored) may be used to accelerate the querying of the logical-to-physical table 112. Moreover, it may be possible to perform the comparisons described herein in parallel (e.g., by a plurality of cores 410) over different logical-to-physical ranges.

Figure 5:
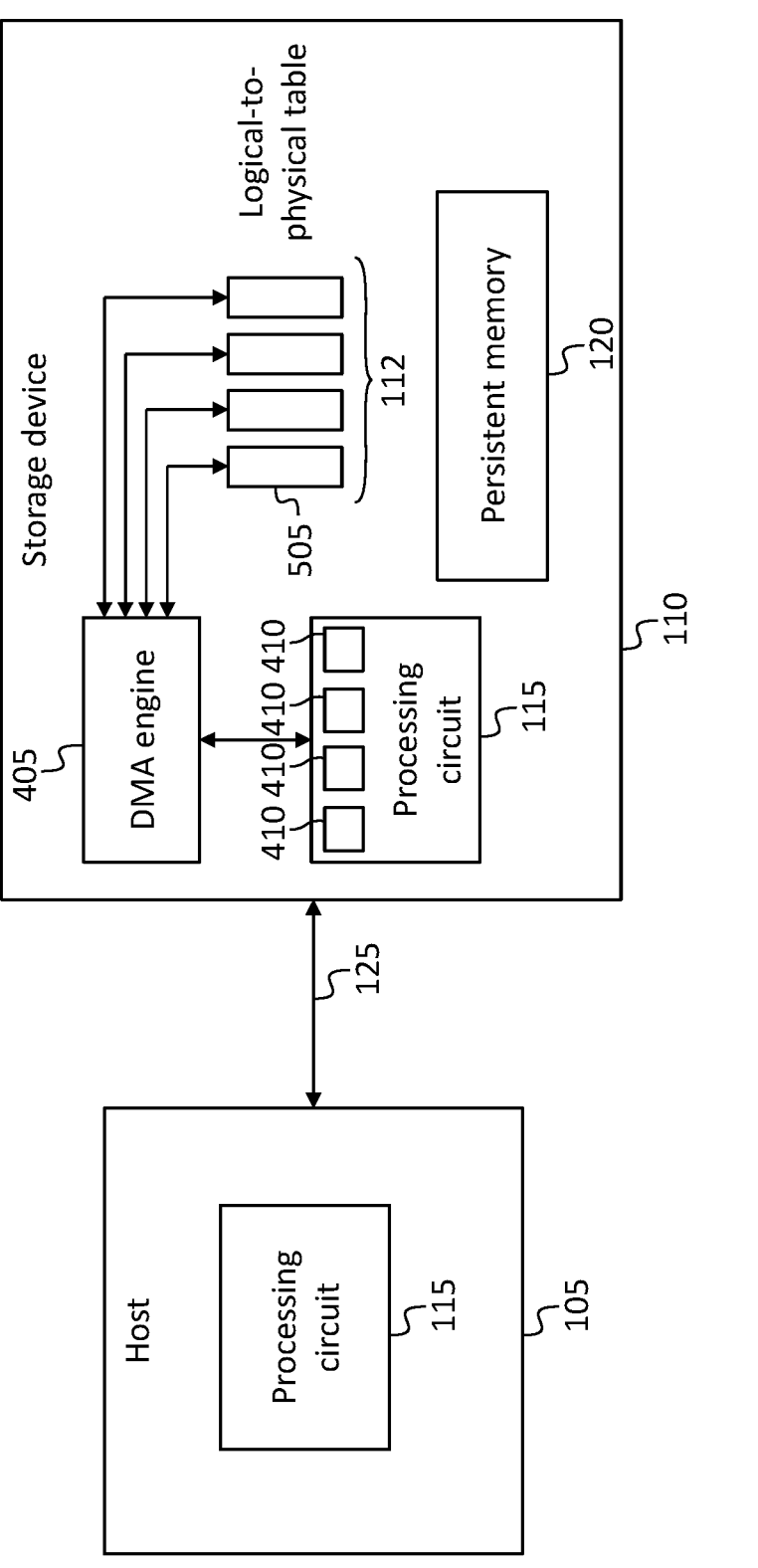
FIG. 5 is a block diagram of a system suitable for performing searches of a logical-to-physical table in parallel, in respective ranks or banks of memory.

In some embodiments, a processor (e.g., a processing circuit) of the persistent storage device 110 may include multiple cores, each core being or including a stored-program computer. Each core may run an independent check on one or more logical block addresses, and an OR of the results (where mapped corresponds to true, and unmapped corresponds to false) from the cores may be returned for each granularity. Early termination performed by one core may optionally trigger an early termination of the other cores since the result from all cores may be OR'ed. In an embodiment with multiple DRAM access points, the multiple DRAM access points may be used to parallelize the search for mapped logical block addresses. FIG. 5 illustrates such parallel access, in some embodiments. The paralleliz-ing of access to DRAM may occur on several levels, including at the DRAM interface level (e.g., if multiple DRAM interfaces are present), at the level of DRAM ranks (e.g., if multiple ranks are accessed in parallel) and at the level of banks (e.g., if multiple banks are accessed in parallel). In FIG. 5, different portions 505 of the DRAM storing the logical-to-physical table 112 are accessed in parallel; each such portion 505 may be a rank, or a bank, for example.

For example, two separate DRAMs may be connected to a processor by two separate DRAM interfaces. Enabling a sequential page read in one DRAM die while also doing a sequential page read on another DRAM die may be employed to enable bank or page parallelism in DRAM accesses.

Figure 6:
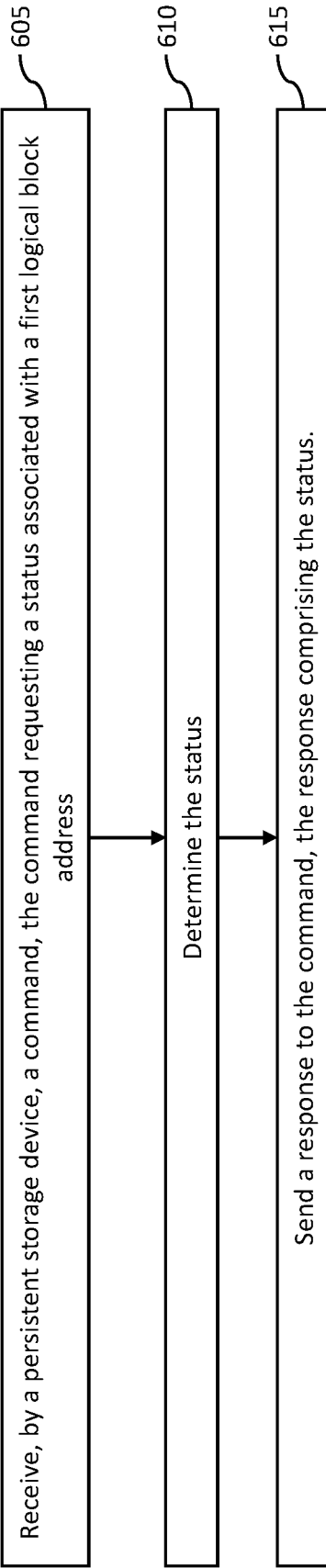
FIG. 6 is a flow chart of a method, according to an embodiment of the present disclosure.

FIG. 6 is a flow chart of a method, in some embodiments. The method includes: receiving, at 605, by a persistent storage device, a command, the command requesting a status associated with a first logical block address; deter-mining the status, at 610; and sending, at 615, a response to the command, the response including the status.

In some embodiments, the command includes a logical block address range, the first logical block address being within the logical block address range. In some embodi-ments, the status includes a status of an allocation granu-larity, the allocation granularity including the first logical block address. In some embodiments, the determining of the status includes determining that the allocation granularity has a size at least as great as a size of a mapping unit. In some embodiments, the determining of the status further includes: querying a logical-to-physical table for the first logical block address, to obtain a first query result; deter-mining, based on the first query result, that the status of a mapping unit containing the first logical block address is unmapped; and in response to determining that the status of the mapping unit containing the first logical block address is unmapped, querying the logical-to-physical table for a sec-ond logical block address of the allocation granularity, to obtain a second query result.

In some embodiments, the determining of the status further includes: determining, based on the second query result, that the status of a mapping unit containing the second logical block address is mapped; and in response to determining that the status of the mapping unit containing the second logical block address is mapped, determining that the status of the allocation granularity is mapped. In some embodiments, the second logical block address differs from the first logical block address by at least an amount corre-sponding to the size of the mapping unit. In some embodi-ments, the determining of the status includes determining that an allocation granularity has a size smaller than a size of a mapping unit. In some embodiments, the determining of the status further includes: querying a logical-to-physical table for the first logical block address, to obtain a first query result; determining, based on the first query result, that the status of a mapping unit containing the first logical block address is unmapped; and in response to determining that the status of the mapping unit containing the first logical block address is unmapped, determining that the status of the allocation granularity is unmapped.

In some embodiments, the determining of the status further includes: querying a logical-to-physical table for the first logical block address, to obtain a first query result; determining, based on the first query result, that the status of a mapping unit containing the first logical block address is mapped; in response to determining that the status of the mapping unit containing the first logical block address is mapped, querying data or metadata, associated with the first logical block address, in persistent memory, to obtain a second query result; determining, based on the second query result, that the status of the first logical block address is unmapped; and in response to determining that the status of the first logical block address is unmapped, querying data or metadata, associated with a second logical block address within the allocation granularity, in persistent memory, to obtain a third query result. In some embodiments, the determining of the status further includes: determining, based on the third query result, that the status of the second logical block address is mapped; and in response to deter-mining that the status of the second logical block address is mapped, determining that the status of the allocation granu-larity is mapped.

In some embodiments, the determining of the status further includes: querying a logical-to-physical table for the first logical block address, to obtain a first query result; determining, based on the first query result, that the status of a mapping unit containing the first logical block address is mapped; in response to determining that the status of the mapping unit containing the first logical block address is mapped, querying data or metadata, associated with the first logical block address, in persistent memory to obtain a second query result; determining, based on the second query result, that the status of the first logical block address is mapped; and in response to determining that the status of the first logical block address is mapped, determining that the status of the allocation granularity is mapped.

As used herein, "a portion of" something means "at least some of" the thing, and as such may mean less than all of, or all of, the thing. As such, "a portion of" a thing includes the entire thing as a special case, i.e., the entire thing is an example of a portion of the thing. As used herein, when a second quantity is "within Y" of a first quantity X, it means that the second quantity is at least X-Y and the second quantity is at most X+Y. As used herein, when a second number is "within Y %" of a first number, it means that the second number is at least (1−Y/100) times the first number and the second number is at most (1+Y/100) times the first number. As used herein, the term "or" should be interpreted as "and/or", such that, for example, "A or B" means any one of "A" or "B" or "A and B".

The background provided in the Background section of the present disclosure section is included only to set context, and the content of this section is not admitted to be prior art. Any of the components or any combination of the compo-nents described (e.g., in any system diagrams included herein) may be used to perform one or more of the opera-tions of any flow chart included herein. Further, (i) the operations are example operations, and may involve various additional steps not explicitly covered, and (ii) the temporal order of the operations may be varied.

Each of the terms "processing circuit" and "means for processing" is used herein to mean any combination of hardware, firmware, and software, employed to process data or digital signals. Processing circuit hardware may include, for example, application specific integrated circuits (ASICs), general purpose or special purpose central processing units (CPUs), digital signal processors (DSPs), graphics processing units (GPUs), and programmable logic devices such as field programmable gate arrays (FPGAs). In a processing circuit, as used herein, each function is performed either by hardware configured, i.e., hard-wired, to perform that function, or by more general-purpose hardware, such as a CPU, configured to execute instructions stored in a non-transitory storage medium. A processing circuit may be fabricated on a single printed circuit board (PCB) or distributed over several interconnected PCBs. A processing circuit may contain other processing circuits; for example, a processing circuit may include two processing circuits, an FPGA and a CPU, interconnected on a PCB.

As used herein, when a method (e.g., an adjustment) or a first quantity (e.g., a first variable) is referred to as being "based on" a second quantity (e.g., a second variable) it means that the second quantity is an input to the method or influences the first quantity, e.g., the second quantity may be an input (e.g., the only input, or one of several inputs) to a function that calculates the first quantity, or the first quantity may be equal to the second quantity, or the first quantity may be the same as (e.g., stored at the same location or locations in memory as) the second quantity.

It will be understood that, although the terms "first", "second", "third", etc., may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed herein could be termed a second element, component, region, layer or section, without departing from the spirit and scope of the inventive concept.

The terminology used herein is for the purpose of describing particular embodiments only and is not intended to be limiting of the inventive concept. As used herein, the terms "substantially," "about," and similar terms are used as terms of approximation and not as terms of degree, and are intended to account for the inherent deviations in measured or calculated values that would be recognized by those of ordinary skill in the art.

As used herein, the singular forms "a" and "an" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Further, the use of "may" when describing embodiments of the inventive concept refers to "one or more embodiments of the present disclosure". Also, the term "exemplary" is intended to refer to an example or illustration. As used herein, the terms "use," "using," and "used" may be considered synonymous with the terms "utilize," "utilizing," and "utilized," respectively.

It will be understood that when an element or layer is referred to as being "on", "connected to", "coupled to", or "adjacent to" another element or layer, it may be directly on, connected to, coupled to, or adjacent to the other element or layer, or one or more intervening elements or layers may be present. In contrast, when an element or layer is referred to as being "directly on", "directly connected to", "directly coupled to", or "immediately adjacent to" another element or layer, there are no intervening elements or layers present.

Any numerical range recited herein is intended to include all sub-ranges of the same numerical precision subsumed within the recited range. For example, a range of "1.0 to 10.0" or "between 1.0 and 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Similarly, a range described as "within 35% of 10" is intended to include all subranges between (and including) the recited minimum value of 6.5 (i.e., (1−35/100) times 10) and the recited maximum value of 13.5 (i.e., (1+35/100) times 10), that is, having a minimum value equal to or greater than 6.5 and a maximum value equal to or less than 13.5, such as, for example, 7.4 to 10.6. Any maximum numerical limitation recited herein is intended to include all lower numerical limitations subsumed therein and any minimum numerical limitation recited in this specification is intended to include all higher numerical limitations subsumed therein.

Some embodiments may include features of the following numbered statements.

1. A method, comprising:
receiving, by a persistent storage device, a command, the command requesting a status associated with a first logical block address;
determining the status; and
sending a response to the command, the response comprising the status.

2. The method of statement 1, wherein the command comprises a logical block address range, the first logical block address being within the logical block address range.

3. The method of statement 1 or statement 2, wherein the status comprises a status of an allocation granularity, the allocation granularity including the first logical block address.

4. The method of statement 3, wherein the determining of the status comprises determining that the allocation granularity has a size at least as great as a size of a mapping unit.

5. The method of statement 4, wherein the determining of the status further comprises:
querying a logical-to-physical table for the first logical block address, to obtain a first query result;
determining, based on the first query result, that the status of a mapping unit containing the first logical block address is unmapped; and
in response to determining that the status of the mapping unit containing the first logical block address is unmapped, querying the logical-to-physical table for a second logical block address of the allocation granularity, to obtain a second query result.

6. The method of statement 5, wherein the determining of the status further comprises:

determining, based on the second query result, that the status of a mapping unit containing the second logical block address is mapped; and in response to determining that the status of the mapping unit containing the second logical block address is mapped, determining that the status of the allocation granularity is mapped.

7. The method of statement 6, wherein the second logical block address differs from the first logical block address by at least an amount corresponding to the size of the mapping unit.

8. The method of statement 3, wherein the determining of the status comprises determining that an allocation granularity has a size smaller than a size of a mapping unit.

9. The method of statement 8, wherein the determining of the status further comprises:

querying a logical-to-physical table for the first logical block address, to obtain a first query result;

determining, based on the first query result, that the status of a mapping unit containing the first logical block address is unmapped; and in response to determining that the status of the mapping unit containing the first logical block address is unmapped, determining that the status of the allocation granularity is unmapped.

10. The method of statement 8, wherein the determining of the status further comprises:

querying a logical-to-physical table for the first logical block address, to obtain a first query result;

determining, based on the first query result, that the status of a mapping unit containing the first logical block address is mapped;

in response to determining that the status of the mapping unit containing the first logical block address is mapped, querying data or metadata, associated with the first logical block address, in persistent memory, to obtain a second query result;

determining, based on the second query result, that the status of the first logical block address is unmapped; and in response to determining that the status of the first logical block address is unmapped, querying data or metadata, associated with a second logical block address within the allocation granularity, in persistent memory, to obtain a third query result.

11. The method of statement 10, wherein the determining of the status further comprises:

determining, based on the third query result, that the status of the second logical block address is mapped; and in response to determining that the status of the second logical block address is mapped, determining that the status of the allocation granularity is mapped.

12. The method of statement 8, wherein the determining of the status further comprises:

querying a logical-to-physical table for the first logical block address, to obtain a first query result;

determining, based on the first query result, that the status of a mapping unit containing the first logical block address is mapped;

in response to determining that the status of the mapping unit containing the first logical block address is mapped, querying data or metadata, associated with the first logical block address, in persistent memory to obtain a second query result;

determining, based on the second query result, that the status of the first logical block address is mapped; and in response to determining that the status of the first logical block address is mapped, determining that the status of the allocation granularity is mapped.

13. A persistent storage device, comprising:

persistent memory;

a processing circuit; and memory, the memory storing instructions, that, when executed by the processing circuit, cause the processing circuit to perform a method, the method comprising:

receiving a command, the command requesting a status associated with a first logical block address;

determining the status; and sending a response to the command, the response comprising the status.

14. The persistent storage device of statement 13, wherein:

the status comprises a status of an allocation granularity, the allocation granularity including the first logical block address, and the determining of the status comprises:

determining that the allocation granularity has a size at least as great as a size of a mapping unit;

querying a logical-to-physical table for the first logical block address, to obtain a first query result;

determining, based on the first query result, that the status of a mapping unit containing the first logical block address is unmapped;

in response to determining that the status of the mapping unit containing the first logical block address is unmapped, querying the logical-to-physical table for a second logical block address of the allocation granularity, to obtain a second query result;

determining, based on the second query result, that the status of a mapping unit containing the second logical block address is mapped; and in response to determining that the status of the mapping unit containing the second logical block address is mapped, determining that the status of the allocation granularity is mapped.

15. The persistent storage device of statement 13, wherein:

the status comprises a status of an allocation granularity, the allocation granularity including the first logical block address; and the determining of the status comprises:

determining that an allocation granularity has a size smaller than a size of a mapping unit;

querying a logical-to-physical table for the first logical block address, to obtain a first query result;

determining, based on the first query result, that the status of a mapping unit containing the first logical block address is unmapped; and in response to determining that the status of the mapping unit containing the first logical block address is unmapped, determining that the status of the allocation granularity is unmapped.

16. The persistent storage device of statement 13, wherein:

the status comprises a status of an allocation granularity, the allocation granularity including the first logical block address;

the determining of the status comprises:

determining that an allocation granularity has a size smaller than a size of a mapping unit;

querying a logical-to-physical table for the first logical block address, to obtain a first query result;

determining, based on the first query result, that the status of a mapping unit containing the first logical block address is mapped;

in response to determining that the status of the mapping unit containing the first logical block address is mapped, querying data or metadata, associated with the first logical block address, in persistent memory, to obtain a second query result;

determining, based on the second query result, that the status of the first logical block address is unmapped;

in response to determining that the second mapping unit is unmapped, querying data or metadata, associated with a second logical block address within the allocation granularity, in persistent memory, to obtain a third query result;

determining, based on the third query result, that the status of the second logical block address is mapped; and in response to determining that the status of the second logical block address is mapped, determining that the status of the allocation granularity is mapped.

17. The persistent storage device of statement 13, wherein:

the status comprises a status of an allocation granularity, the allocation granularity including the first logical block address; and the determining of the status comprises:

querying a logical-to-physical table for the first logical block address, to obtain a first query result;

determining, based on the first query result, that the status of a mapping unit containing the first logical block address is mapped;

in response to determining that the status of the mapping unit containing the first logical block address is mapped, querying data or metadata, associated with the first logical block address, in persistent memory to obtain a second query result;

determining, based on the second query result, that the status of the first logical block address is mapped; and in response to determining that the status of the first logical block address is mapped, determining that the status of the allocation granularity is mapped.

18. A system, comprising:

a host; and a persistent storage device, connected to the host, the host being configured to send, to the persistent storage device, a command, the command requesting a status associated with a first logical block address, the persistent storage device being configured, in response to receiving the command, to:

determine the status; and send a response to the command, the response comprising the status.

19. The system of statement 18, wherein the command comprises a logical block address range, the first logical block address being within the logical block address range.

20. The system of statement 18 or statement 19, wherein the status comprises a status of an allocation granularity, the allocation granularity including the first logical block address.

Although exemplary embodiments of a system and method for status reporting for a storage device have been specifically described and illustrated herein, many modifications and variations will be apparent to those skilled in the art. Accordingly, it is to be understood that a system and method for status reporting for a storage device constructed according to principles of this disclosure may be embodied other than as specifically described herein. The invention is also defined in the following claims, and equivalents thereof.

What is claimed is:

1. A method, comprising:

receiving, by a persistent storage device, a command, the command requesting a status associated with a first logical block address;

determining the status associated with the first logical block address; and sending a response to the command, the response comprising the status associated with the first logical block address, wherein:

the status associated with the first logical block address comprises an unmapped status, the status associated with the first logical block address comprises a status of an allocation granularity, the allocation granularity is associated with a set of memory locations associated with a range of logical block addresses, and the range of logical block address includes the first logical block address.

2. The method of claim 1, wherein the command comprises a logical block address range, the first logical block address being within the logical block address range.

3. The method of claim 1, wherein the determining of the status associated with the first logical block address comprises determining that the allocation granularity has a size at least as great as a size of a mapping unit.

4. The method of claim 3, wherein the determining of the status associated with the first logical block address further comprises:

querying a logical-to-physical table for the first logical block address, to obtain a first query result;

determining, based on the first query result, that the status of a mapping unit containing the first logical block address is unmapped; and in response to determining that the status of the mapping unit containing the first logical block address is unmapped, querying the logical-to-physical table for a second logical block address of the allocation granularity, to obtain a second query result.

5. The method of claim 4, wherein the determining of the status associated with the first logical block address further comprises:

determining, based on the second query result, that the status of a mapping unit containing the second logical block address is mapped; and in response to determining that the status of the mapping unit containing the second logical block address is mapped, determining that the status of the allocation granularity is mapped.

6. The method of claim 5, wherein the second logical block address differs from the first logical block address by at least an amount corresponding to the size of the mapping unit.

7. The method of claim 1, wherein the determining of the status associated with the first logical block address comprises determining that an allocation granularity has a size smaller than a size of a mapping unit.

8. The method of claim 7, wherein the determining of the status associated with the first logical block address further comprises:

querying a logical-to-physical table for the first logical block address, to obtain a first query result;

determining, based on the first query result, that the status of a mapping unit containing the first logical block address is unmapped; and in response to determining that the status of the mapping unit containing the first logical block address is unmapped, determining that the status of the allocation granularity is unmapped.

9. The method of claim 7, wherein the determining of the status associated with the first logical block address further comprises:

querying a logical-to-physical table for the first logical block address, to obtain a first query result;

determining, based on the first query result, that the status of a mapping unit containing the first logical block address is mapped;

in response to determining that the status of the mapping unit containing the first logical block address is mapped, querying data or metadata, associated with the first logical block address, in persistent memory, to obtain a second query result;

determining, based on the second query result, that the status of the first logical block address is unmapped; and in response to determining that the status of the first logical block address is unmapped, querying data or metadata, associated with a second logical block address within the allocation granularity, in persistent memory, to obtain a third query result.

10. The method of claim 9, wherein the determining of the status associated with the first logical block address further comprises:

determining, based on the third query result, that the status of the second logical block address is mapped; and in response to determining that the status of the second logical block address is mapped, determining that the status of the allocation granularity is mapped.

11. The method of claim 7, wherein the determining of the status associated with the first logical block address further comprises:

querying a logical-to-physical table for the first logical block address, to obtain a first query result;

determining, based on the first query result, that the status of a mapping unit containing the first logical block address is mapped;

in response to determining that the status of the mapping unit containing the first logical block address is mapped, querying data or metadata, associated with the first logical block address, in persistent memory to obtain a second query result;

determining, based on the second query result, that the status of the first logical block address is mapped; and in response to determining that the status of the first logical block address is mapped, determining that the status of the allocation granularity is mapped.

12. A persistent storage device, comprising:

persistent memory;

a processing circuit; and memory, the memory storing instructions, that, when executed by the processing circuit, cause the processing circuit to perform a method, the method comprising:

receiving a command, the command requesting a status associated with a first logical block address;

determining the status associated with the first logical block address; and sending a response to the command, the response comprising the status associated with the first logical block address, wherein:

the status associated with the first logical block address comprises an unmapped status, the status associated with the first logical block address comprises a status of an allocation granularity, the allocation granularity is associated with a set of memory locations associated with a range of logical block addresses, and the range of logical block address includes the first logical block address.

13. The persistent storage device of claim 12, wherein:

the determining of the status associated with the first logical block address comprises:

determining that the allocation granularity has a size at least as great as a size of a mapping unit;

querying a logical-to-physical table for the first logical block address, to obtain a first query result;

determining, based on the first query result, that the status of a mapping unit containing the first logical block address is unmapped;

in response to determining that the status of the mapping unit containing the first logical block address is unmapped, querying the logical-to-physical table for a second logical block address of the allocation granularity, to obtain a second query result;

determining, based on the second query result, that the status of a mapping unit containing the second logical block address is mapped; and in response to determining that the status of the mapping unit containing the second logical block address is mapped, determining that the status of the allocation granularity is mapped.

14. The persistent storage device of claim 12, wherein the determining of the status associated with the first logical block address comprises:

determining that the allocation granularity has a size smaller than a size of a mapping unit;

querying a logical-to-physical table for the first logical block address, to obtain a first query result;

determining, based on the first query result, that the status of a mapping unit containing the first logical block address is unmapped; and in response to determining that the status of the mapping unit containing the first logical block address is unmapped, determining that the status of the allocation granularity is unmapped.

15. The persistent storage device of claim 12, wherein:

the determining of the status associated with the first logical block address comprises:

determining that the allocation granularity has a size smaller than a size of a mapping unit;

querying a logical-to-physical table for the first logical block address, to obtain a first query result;

determining, based on the first query result, that the status of a mapping unit containing the first logical block address is mapped;

in response to determining that the status of the mapping unit containing the first logical block address is mapped, querying data or metadata, associated with the first logical block address, in persistent memory, to obtain a second query result;

determining, based on the second query result, that the status of the first logical block address is unmapped;

in response to determining that the second mapping unit is unmapped, querying data or metadata, associated with a second logical block address within the allocation granularity, in persistent memory, to obtain a third query result;

determining, based on the third query result, that the status of the second logical block address is mapped; and in response to determining that the status of the second logical block address is mapped, determining that the status of the allocation granularity is mapped.

16. The persistent storage device of claim 12, wherein the determining of the status associated with the first logical block address comprises:

querying a logical-to-physical table for the first logical block address, to obtain a first query result;

determining, based on the first query result, that the status of a mapping unit containing the first logical block address is mapped;

in response to determining that the status of the mapping unit containing the first logical block address is mapped, querying data or metadata, associated with the first logical block address, in persistent memory to obtain a second query result;

determining, based on the second query result, that the status of the first logical block address is mapped; and in response to determining that the status of the first logical block address is mapped, determining that the status of the allocation granularity is mapped.

17. A system, comprising:

a host; and a persistent storage device, connected to the host, the host being configured to send, to the persistent storage device, a command, the command requesting a status associated with a first logical block address, the persistent storage device being configured, in response to receiving the command, to:

determine the status associated with the first logical block address; and send a response to the command, the response comprising the status associated with the first logical block address, wherein:

the status associated with the first logical block address comprises an unmapped status, the status associated with the first logical block address comprises a status of an allocation granularity, the allocation granularity is associated with a set of memory locations associated with a range of logical block addresses, and the range of logical block address includes the first logical block address.

18. The system of claim 17, wherein the command comprises a logical block address range, the first logical block address being within the logical block address range.

* * * * *